US012602027B2

(12) United States Patent　　(10) Patent No.:　US 12,602,027 B2
　　Koike et al.　　　　　　　　　　(45) Date of Patent:　Apr. 14, 2026

(54) OPERATION CONTROL DEVICE AND PROGRAM

(71) Applicant: FANUC CORPORATION, Yamanashi (JP)

(72) Inventors: Masataka Koike, Yamanashi (JP); Hiroyuki Kawamura, Yamanashi (JP); Takashi Idei, Yamanashi (JP); Koichiro Horiguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 413 days.

(21) Appl. No.: 18/553,518

(22) PCT Filed: Jun. 2, 2021

(86) PCT No.: PCT/JP2021/021095
§ 371 (c)(1),
(2) Date: Sep. 29, 2023

(87) PCT Pub. No.: WO2022/254639
PCT Pub. Date: Dec. 8, 2022

(65) Prior Publication Data
US 2024/0192662 A1　　Jun. 13, 2024

(51) Int. Cl.
G05B 19/4155　　(2006.01)

(52) U.S. Cl.
CPC .................... G05B 19/4155 (2013.01); G05B 2219/35519 (2013.01)

(58) Field of Classification Search
USPC ........................................................ 700/159
See application file for complete search history.

(56) References Cited

U.S. PATENT DOCUMENTS

2012/0143354 A1　6/2012　Bock et al.
2016/0214806 A1*　7/2016　Wasserman ............ B21K 27/00

FOREIGN PATENT DOCUMENTS

CN　　104865894 A　　8/2015
CN　　107315343 A　　11/2017
(Continued)

OTHER PUBLICATIONS

RU_84269_U1 (Year: 2009).*
(Continued)

*Primary Examiner* — Hien D Khuu
(74) *Attorney, Agent, or Firm* — Studebaker Brackett PLLC

(57)　　　　　　ABSTRACT

Provided are an operation control device and program, which are capable of appropriately combining drive signals of two systems enabling improvement in processing speed while suppressing occurrence of a synchronization error. The present invention comprises: a first drive signal output unit that outputs a first drive signal that is a drive signal of a first system; a second drive signal output unit that outputs a second drive signal that is a drive signal of a second system; a transfer characteristic acquisition unit that acquires a transfer characteristic of position control of the first system; a correction unit that corrects the output first drive signal to obtain a corrected drive signal by using the acquired transfer characteristic; a first operation speed calculation unit that calculates the operation speed of the first system from the corrected drive signal as a first operation speed; a second operation speed calculation unit that calculates the operation speed of the second system from the second drive signal as a second operation speed; a synthesized drive signal generation unit that generates a synthesized drive signal by combining the corrected drive signal and the second drive signal; and an operation control unit that controls the operation of the second system by using the (Continued)

first operation speed, the second operation speed, and the synthesized drive signal.

4 Claims, 13 Drawing Sheets

(56)                    References Cited

FOREIGN PATENT DOCUMENTS

| | | | |
|---|---|---|---|
| JP | H04-019043 | A | 1/1992 |
| JP | H06-328317 | A | 11/1994 |
| JP | H07-230312 | A | 8/1995 |
| JP | H08-241126 | A | 9/1996 |
| JP | 2713566 | B2 | 2/1998 |
| JP | 2003-131712 | A | 5/2003 |
| JP | 2004-288164 | A | 10/2004 |
| JP | 2005-216135 | A | 8/2005 |
| JP | 2006-216051 | A | 8/2006 |
| JP | 2007-042068 | A | 2/2007 |
| JP | 2016-004435 | A | 1/2016 |

OTHER PUBLICATIONS

You et al. "Study of Synchronous Automatic Speed Control System Based on the Motors Driving Conveyer", IEEE, p. 406-409, 2011. (Year: 2011).*
Tsai et al. "Tracking Control of a Conveyor Belt", IEEE, p. 126-131, Feb. 1996. (Year: 1996).*
International Search Report issued in PCT/JP2021/021095; mailed Jul. 20, 2021.

* cited by examiner

FIG. 4

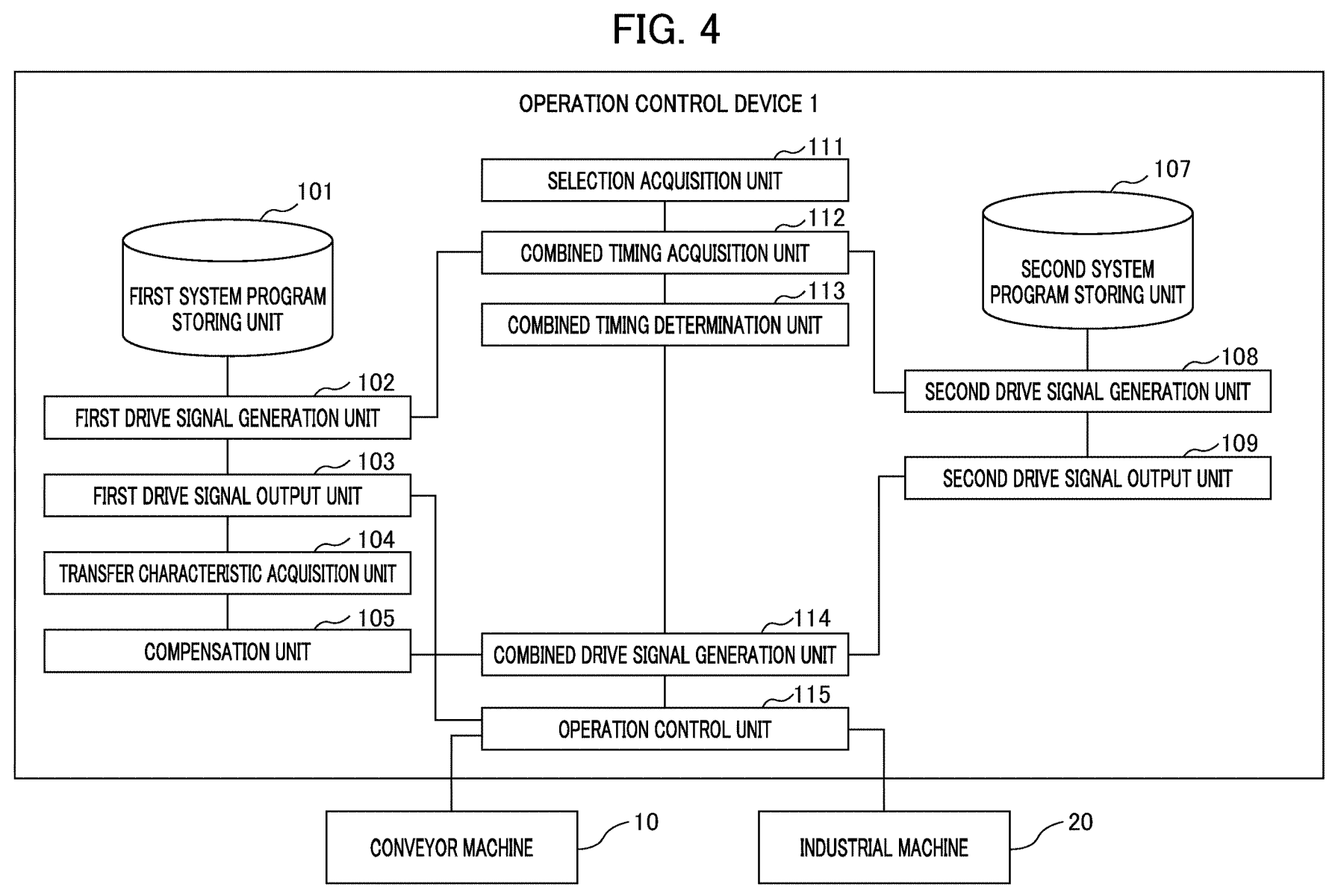

OPERATION CONTROL DEVICE 1

SECOND SYSTEM PROGRAM STORING UNIT 107

SECOND DRIVE SIGNAL GENERATION UNIT 108

SECOND DRIVE SIGNAL OUTPUT UNIT 109

SELECTION ACQUISITION UNIT 111

COMBINED TIMING ACQUISITION UNIT 112

COMBINED TIMING DETERMINATION UNIT 113

COMBINED DRIVE SIGNAL GENERATION UNIT 114

OPERATION CONTROL UNIT 115

FIRST SYSTEM PROGRAM STORING UNIT 101

FIRST DRIVE SIGNAL GENERATION UNIT 102

FIRST DRIVE SIGNAL OUTPUT UNIT 103

TRANSFER CHARACTERISTIC ACQUISITION UNIT 104

COMPENSATION UNIT 105

INDUSTRIAL MACHINE 20

CONVEYOR MACHINE 10

FIG. 5

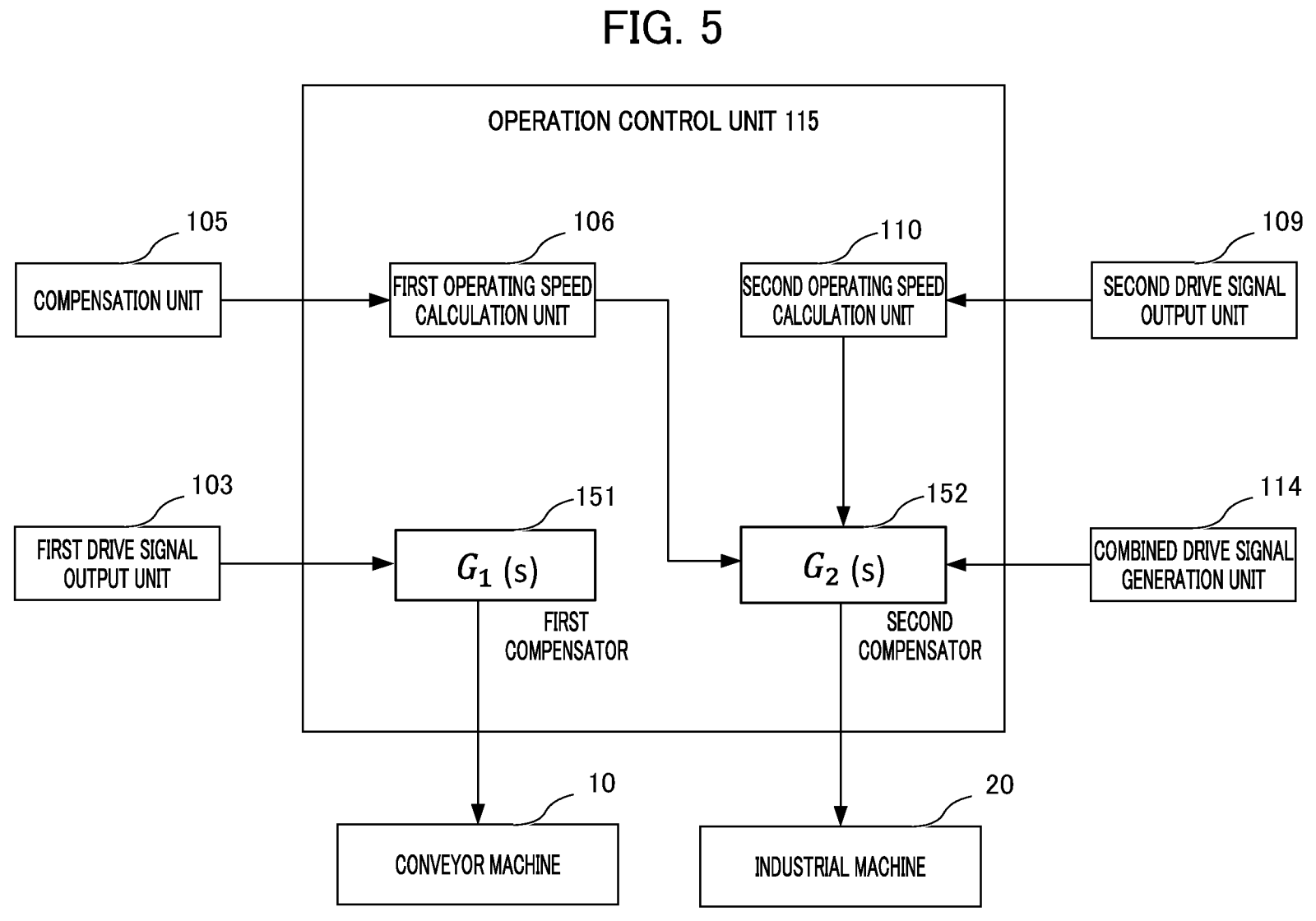

OPERATION CONTROL UNIT 115

109
SECOND DRIVE SIGNAL OUTPUT UNIT

114
COMBINED DRIVE SIGNAL GENERATION UNIT

110
SECOND OPERATING SPEED CALCULATION UNIT

152
$G_2$ (s)
SECOND COMPENSATOR

20
INDUSTRIAL MACHINE

105
COMPENSATION UNIT

106
FIRST OPERATING SPEED CALCULATION UNIT

151
$G_1$ (s)
FIRST COMPENSATOR

103
FIRST DRIVE SIGNAL OUTPUT UNIT

10
CONVEYOR MACHINE

FIG. 7

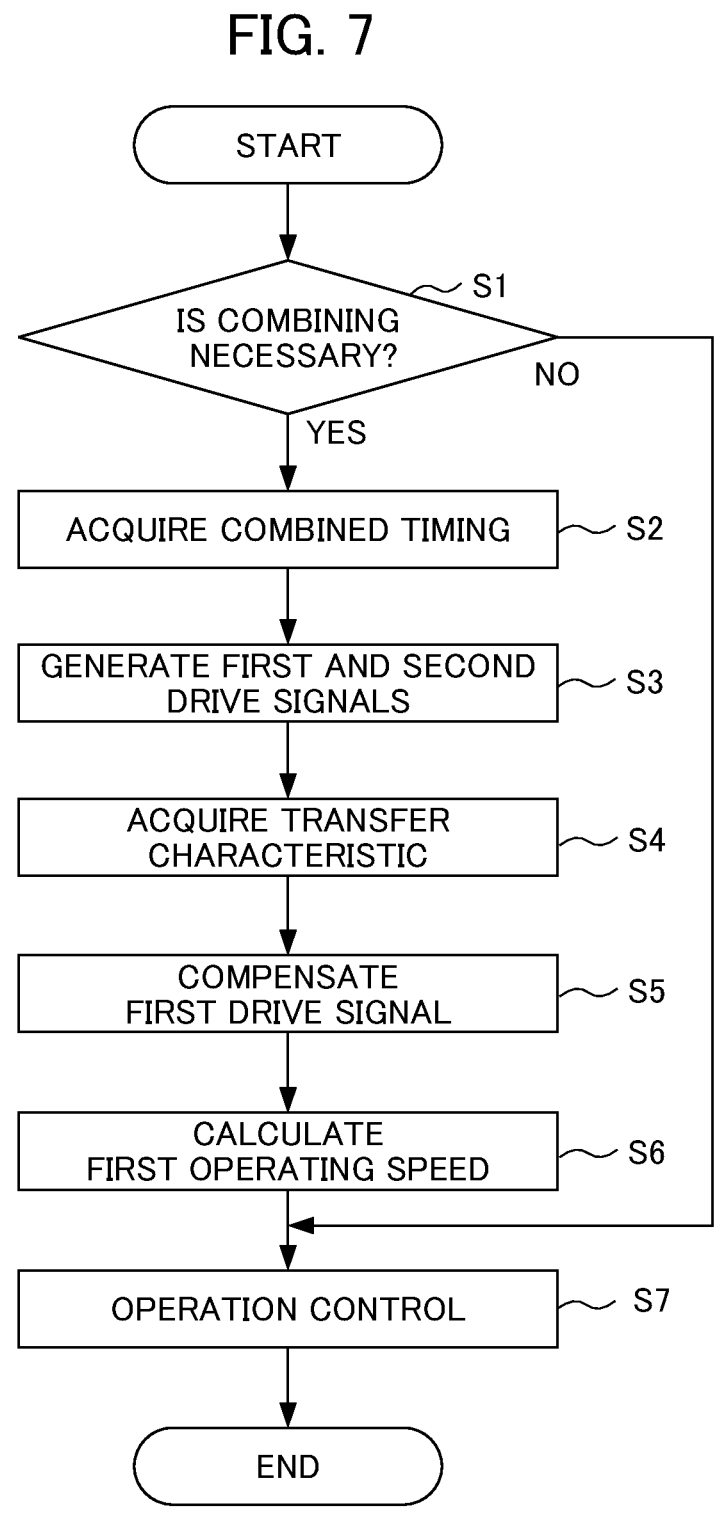

START

S1

IS COMBINING
NECESSARY?

NO

YES

ACQUIRE COMBINED TIMING — S2

GENERATE FIRST AND SECOND
DRIVE SIGNALS — S3

ACQUIRE TRANSFER
CHARACTERISTIC — S4

COMPENSATE
FIRST DRIVE SIGNAL — S5

CALCULATE
FIRST OPERATING SPEED — S6

OPERATION CONTROL — S7

END

POSITION (m)

TIME (second)

POSITIONAL COMMAND
POSITIONAL FEEDBACK

POSITIONAL COMMAND
(SIMPLE ADDITION)

POSITIONAL COMMAND
(TAKE INTO ACCOUNT POSITIONAL ERROR OF PLC)

POSITIONAL FEEDBACK
(SIMPLE ADDITION)

POSITIONAL FEEDBACK
(TAKE INTO ACCOUNT POSITIONAL ERROR OF PLC)

OPERATION CONTROL DEVICE AND PROGRAM

TECHNICAL FIELD

The present disclosure relates to an operation control device and a program.

BACKGROUND ART

Conventionally, a production system that machines a workpiece has been known. The production system includes a conveyor machine that conveys the workpiece, at least one industrial machine that is disposed along the conveyor machine, and an operation control device that controls operation of the conveyor machine and the industrial machine.

The industrial machine includes a tool used to machine the workpiece. The industrial machine uses the tool to machine the conveyed workpiece. Thereby, the industrial machine is able to machine the workpiece into a desired shape.

The operation control device has, for example, both a function of controlling the conveyor machine and a function of controlling the industrial machine. The operation control device causes both the functions to sequentially operate to cause the industrial machine to machine the workpiece. That is, the operation control device uses drive signals of two systems to cause the production system to operate.

When controlling the production system using drive signals of the two systems, it is desirable that the operation control device causes one of the drive signals and the other of the drive signals to be synchronized with each other. It is desirable that the operation control device handles one of the drive signals and the other of the drive signals as one drive signal, for example. Thereby, it is possible to improve production efficiency. What has been proposed as such a device is a computer numerical controller (CNC) system that superimposes a movement command for a shaft on a CNC side and a movement command for a shaft on a programmable machine controller (PMC) side on each other to perform movement control on the shafts (for example, see Patent Document 1). Furthermore, such a device has been proposed that causes a main shaft and a servo shaft to be synchronized with each other to perform tapping (for example, see Patent Document 2).

Patent Document 1: Japanese Unexamined Patent Application, Publication No. H7-230312
Patent Document 2: Japanese Patent No. 2713566

DISCLOSURE OF THE INVENTION

Problems to be Solved by the Invention

The CNC system described in Patent Document 1 superimposes a movement command for the shaft on the CNC side and a movement command for the shaft on the PMC side on each other. Thereby, the CNC system described in Patent Document 1 allows both CNC control and PMC control to be operated together.

By the way, when using drive signals of two systems to be sequentially operated, driving using the other one of the drive signals is executed after shaft movement using one of the drive signals ends. Therefore, when simply superimposing drive signals of the two systems on each other, there may be difficulties in achieving proper operation using the drive signals of the two systems. It is then advantageous if it is possible to properly combine drive signals of two systems with each other.

Furthermore, when two shafts are caused to be synchronized with each other, as described in Patent Document 2, a synchronization error may occur due to a difference in gain between the two shafts. In this case, allowing a gain of the servo shaft to coincide with a gain of the main shaft makes it possible to decrease a synchronization error. That is, setting a gain to coincide with another smaller gain makes it possible to decrease a synchronization error. On the other hand, when setting a gain to coincide with another smaller gain, it is possible to secure machining accuracy, but a processing speed lowers. It is then advantageous if it is possible to suppress occurrence of a synchronization error and to increase a processing speed.

Means for Solving the Problems (1) The present disclosure relates to an operation control device that uses at least drive signals of two systems to control operation of a production system including an industrial machine. The operation control device includes: a first drive signal output unit that outputs a first drive signal which is a drive signal of a first system; a second drive signal output unit that outputs a second drive signal which is a drive signal of a second system; a transfer characteristic acquisition unit that acquires a transfer characteristic of positional control of the first system; a compensation unit that uses the acquired transfer characteristic to compensate the outputted first drive signal into a compensation drive signal; a first operating speed calculation unit that calculates an operating speed of the first system from the compensation drive signal as a first operating speed; a second operating speed calculation unit that calculates an operating speed of the second system from the second drive signal as a second operating speed; a combined drive signal generation unit that generates a combined drive signal by combining the compensation drive signal and the second drive signal with each other; a combined drive signal generation unit that uses the calculated first operating speed, the calculated second operating speed, and the second drive signal to generate a combined drive signal; and an operation control unit that uses the first operating speed, the second operating speed, and the combined drive signal to control operation of the second system.

(2) Furthermore, the present invention relates to a program that causes a computer to function as an operation control device that uses at least drive signals of two systems to control operation of a production system including an industrial machine. The program causes the computer to function as: a first drive signal output unit that outputs a first drive signal which is a drive signal of a first system; a second drive signal output unit that outputs a second drive signal which is a drive signal of a second system; a transfer characteristic acquisition unit that acquires a transfer characteristic of positional control of the first system; a compensation unit that uses the acquired transfer characteristic to compensate the outputted first drive signal into a compensation drive signal; a first operating speed calculation unit that calculates an operating speed of the first system from the compensation drive signal as a first operating speed; a second operating speed calculation unit that calculates an operating speed of the second system from the second drive signal as a second operating speed; a combined drive signal generation unit that generates a combined drive signal by combining the calculated first operating speed, the compensation drive signal, and the second drive signal with each other; a combined drive signal generation unit that uses the calculated first operating speed, the calculated second operating speed, and the second drive signal to generate a combined drive signal; and an operation control unit that uses the first operating speed, the second operating speed, and the combined drive signal to control operation of the second system.

Effects of the Invention

According to the present disclosure, it is possible to provide an operation control device and a program that make it possible to suppress occurrence of a synchronization error and to increase a processing speed.

BRIEF DESCRIPTION OF THE DRAWINGS

FIG. 4 is a block diagram illustrating a configuration of the operation control device according to the embodiment;

FIG. 5 is a block diagram illustrating a configuration of an operation control unit according to the embodiment;

FIG. 7 is a flowchart illustrating operation of the operation control device according to the embodiment;

PREFERRED MODE FOR CARRYING OUT THE INVENTION

An operation control device 1 and a program according to an embodiment of the present disclosure will now be described herein with reference to FIGS. 1 to 13. Before describing the operation control device 1 and the program according to the embodiment, an outline of a production system 100 including the operation control device 1 will first be described.

Figure 1:
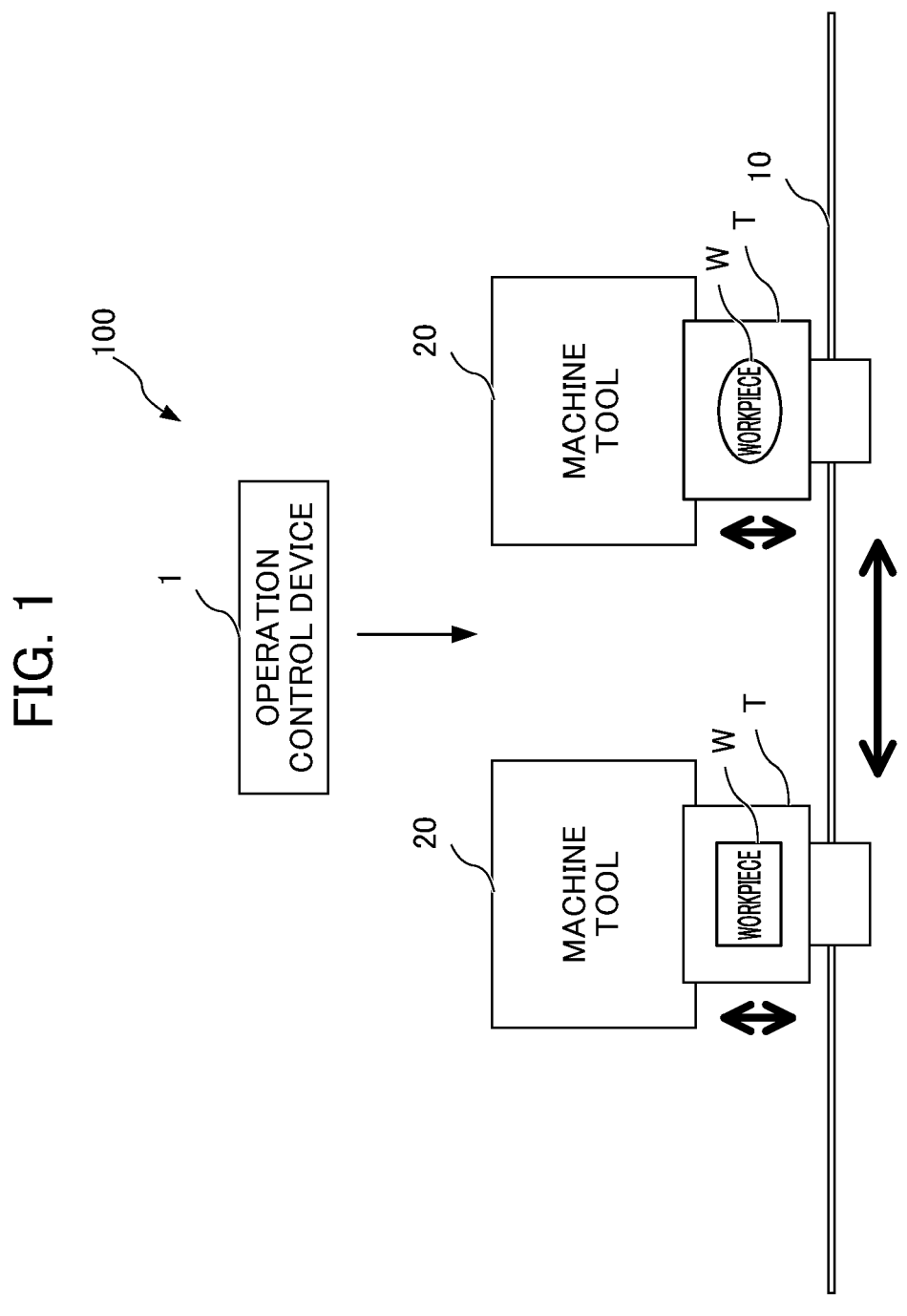
FIG. 1 is a schematic configuration diagram illustrating a production system including an operation control device according to an embodiment of the present disclosure.

The production system 100 represents, for example, a system that conveys a workpiece W and machines the workpiece W. The production system 100 includes, as illustrated in FIG. 1, a conveyor machine 10, an industrial machine 20, and the operation control device 1.

The conveyor machine 10 represents a machine that conveys the workpiece W. The conveyor machine 10 causes, for example, a motor (not shown) to rotate to convey the workpiece W. The conveyor machine 10 conveys the workpiece W in a predetermined direction.

The industrial machine 20 represents, for example, a machine tool. There are two industrial machines 20 disposed, as illustrated in FIG. 1, in a conveying direction of the workpiece W. The industrial machine 20 uses, for example, a tool 21 (see FIG. 2) to machine the workpiece W into a shape set beforehand. Note that the industrial machine 20 may be a machine that varies in type such as a machine tool, an industrial robot, a service robot, a pressure-forging machine, or an injection molding machine.

The operation control device 1 represents a device that controls operation of the conveyor machine 10 and the industrial machine 20. The operation control device 1 uses, for example, at least drive signals of two systems to control operation of the production system 100. The operation control device 1 uses, for example, as a drive signal of a first system, a signal of a programmable logic controller (PLC) for simple machining, for performing simple operation including conveying, and for managing devices on the production system 100. Specifically, the operation control device 1 uses the PLC for causing the conveyor machine 10 to convey the workpiece W. Furthermore, the operation control device 1 uses, for example, as a drive signal of a second system, a drive signal of a numerical controller (NC) for performing machining into a complicated shape and for performing complicated operation. Specifically, the operation control device 1 uses the NC for moving a shaft of the tool 21 attached to the industrial machine 20.

Figure 2:
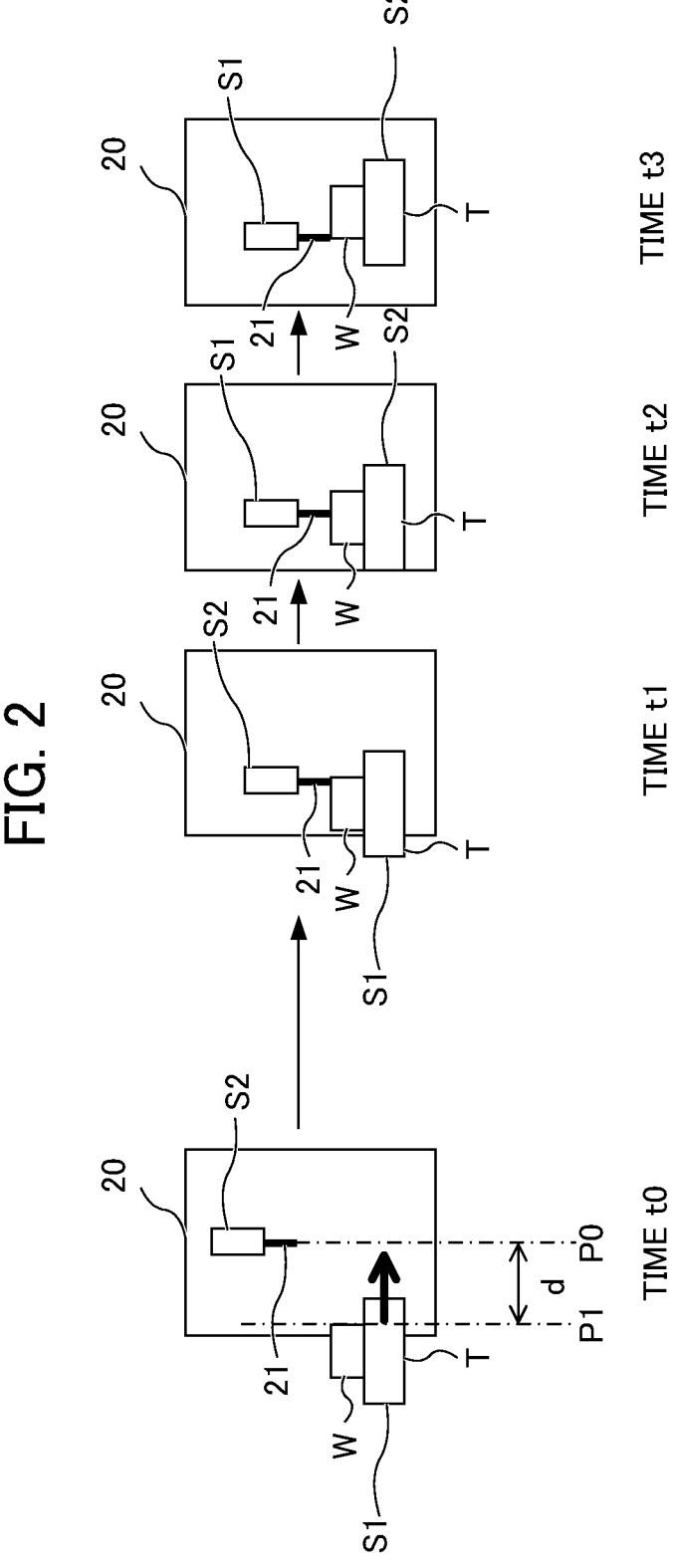
FIG. 2 is a conceptual diagram illustrating an outline of operation in the production system including the operation control device according to the embodiment.
Figure 3:
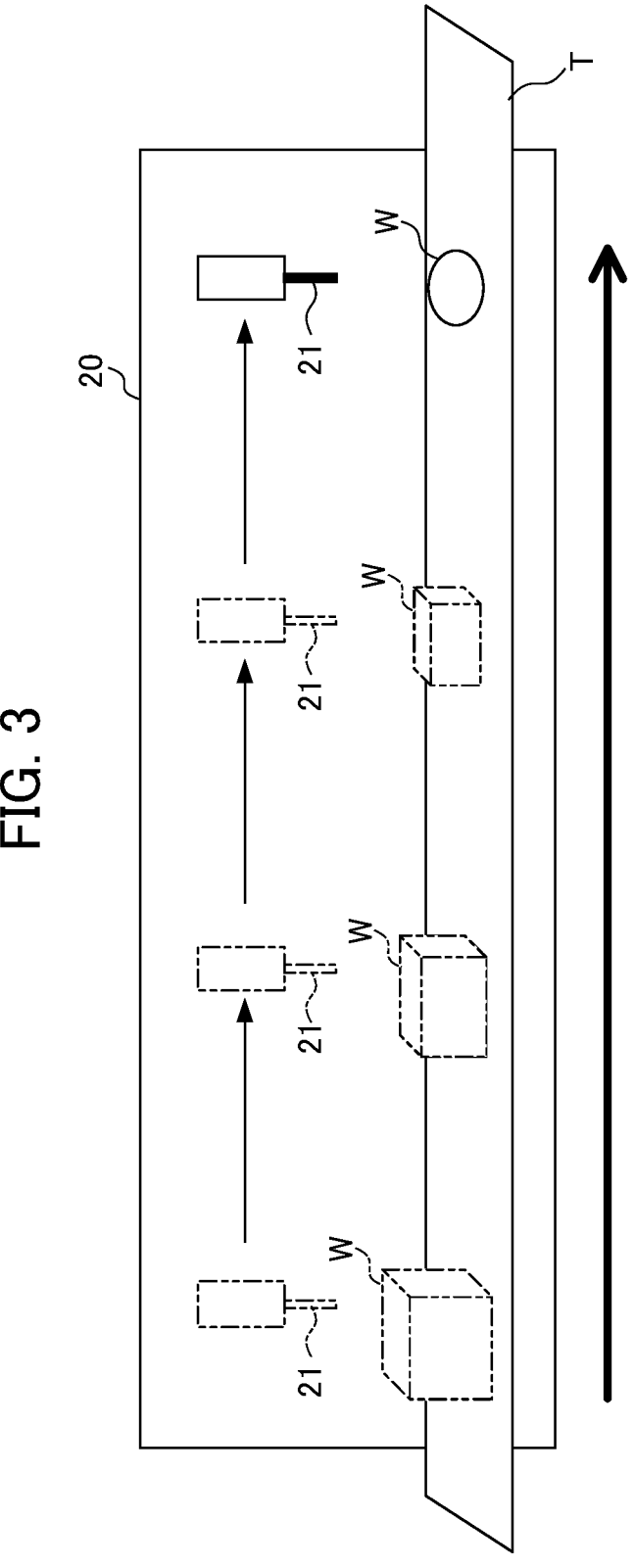
FIG. 3 is a conceptual diagram illustrating an outline of operation in the production system including the operation control device according to the embodiment.

Note herein that the operation control device 1 combines or synthesizes (superimposes), for example, a drive signal of the first system and a drive signal of the second system with each other to control operation of the production system 100. In particular, the operation control device 1 uses a combined drive signal in which two drive signals are combined with each other to drive a tool shaft C2 and uses one of the drive signals to be combined with each other to convey the workpiece. In the operation control device 1, for example, as illustrated in FIGS. 2 and 3, the PLC is caused to convey the workpiece W mounted on a conveying table T (a conveying shaft C1) (shaft control), and the NC causes the tool 21 (the tool shaft C2) to machine the workpiece W. That is, the operation control device 1 causes, at a time to, the tool 21 to move to a machining position P1, at which the tool 21 is moved toward the workpiece W by a distance d with respect to a reference position P0 of the tool 21, to start machining of the workpiece W using the tool 21. Next, the operation control device 1 causes, at times t1, t2, and t3, as the workpiece W is conveyed, the tool 21 to machine the workpiece W to execute both conveying and machining.

Figure 6:
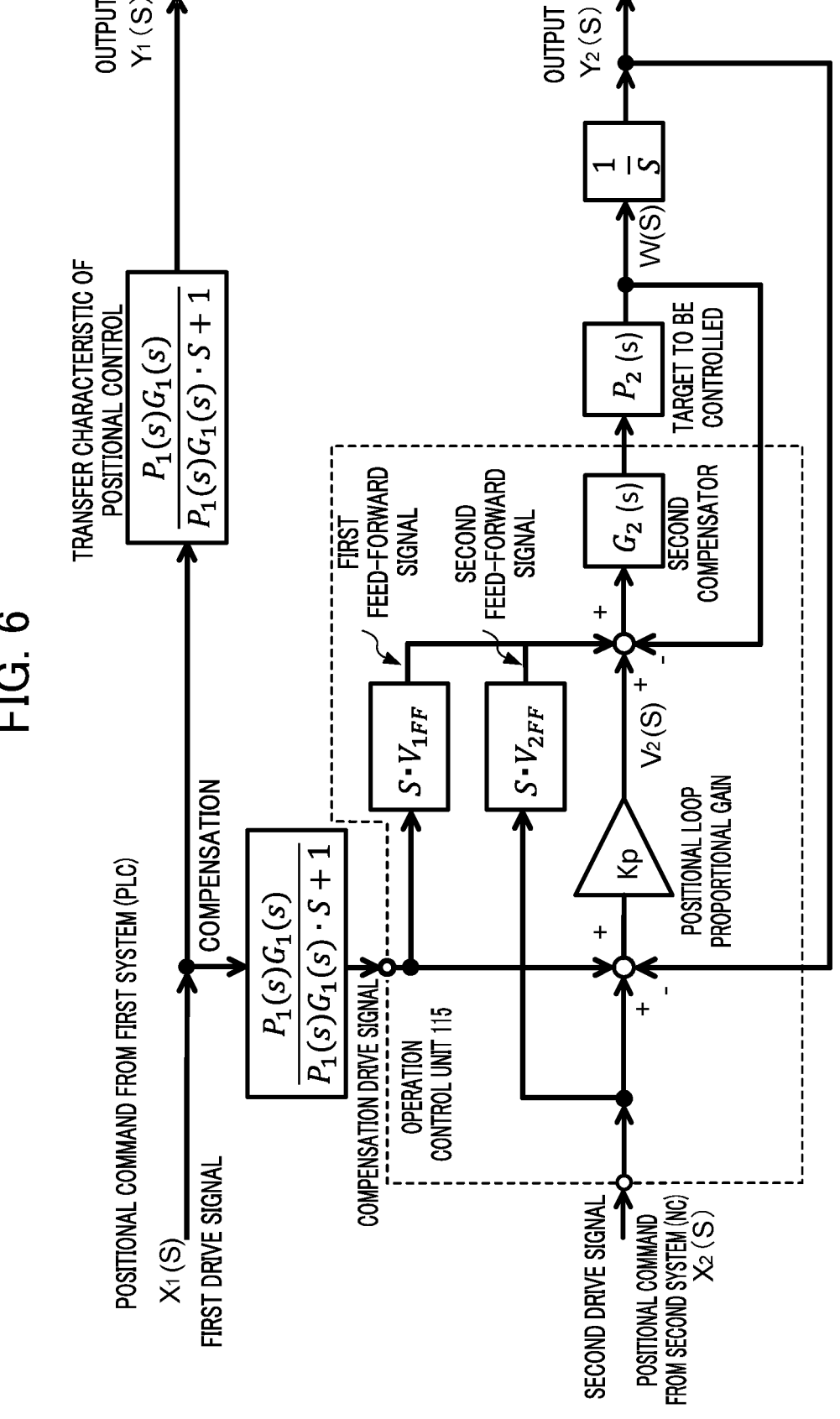
FIG. 6 is a schematic diagram illustrating how signals flow in the operation control device according to the embodiment.

Next, the operation control device 1 and the program according to the embodiment of the present disclosure will now be described with reference to FIGS. 4 to 6. The operation control device 1 according to the present embodiment uses at least drive signals of two systems to control operation of the production system 100 including the industrial machine 20. The operation control device 1 includes, as illustrated in FIG. 4, a first system program storing unit 101, a first drive signal generation unit 102, a first drive signal output unit 103, a transfer characteristic acquisition unit 104, a compensation unit 105, a first operating speed calculation unit 106, a second system program storing unit 107, a second drive signal generation unit 108, a second drive signal output unit 109, a second operating speed calculation unit 110, a selection acquisition unit 111, a combined timing acquisition unit 112, a combined timing determination unit 113, a combined drive signal generation unit 114, and an operation control unit 115.

The first system program storing unit 101 represents, for example, a secondary memory medium such as a hard disk. The first system program storing unit 101 stores a program used to generate a drive signal of the first system. In the present embodiment, the first system program storing unit 101 stores a program for controlling the PLC, for example. Specifically, the first system program storing unit 101 stores a program that causes a shaft of the conveyor machine 10 to convey the workpiece W.

The first drive signal generation unit 102 is achieved as a central processing unit (CPU) operates, for example. The first drive signal generation unit 102 generates a first drive signal which is a drive signal of the first system. In the present embodiment, the first drive signal generation unit 102 generates a drive signal for driving the shaft of the conveyor machine 10.

The first drive signal output unit 103 is achieved as the CPU operates, for example. The first drive signal output unit 103 outputs a first drive signal which is a drive signal of the first system.

The transfer characteristic acquisition unit 104 is achieved as the CPU operates, for example. The transfer characteristic acquisition unit 104 acquires a transfer characteristic of positional control of the first system. The transfer characteristic acquisition unit 104 acquires, for example, a transfer characteristic of positional control of a first drive signal from transfer characteristics of the control device and the conveying shaft C1. In the present embodiment, the transfer characteristic acquisition unit 104 acquires, as illustrated in FIG. 5, P1($s$) as a transfer function of a target to be controlled by the first system and G1($s$) as a transfer function of a compensator of the first system, and thus acquires a transfer characteristic indicated by Mathematical Expression 1 described below.

$$\frac{P_1(s)G_1(s)}{P_1(s)G_1(s)\cdot S+1}$$

The compensation unit 105 is achieved as the CPU operates, for example. The compensation unit 105 uses the acquired transfer characteristic to compensate the outputted first drive signal into a compensation drive signal. The compensation unit 105 uses, for example, the acquired transfer characteristic to compensate the first drive signal into an output value of the conveying shaft C1 to be actually driven. That is, the compensation unit 105 compensates the first drive signal in accordance with an output characteristic of the first system in response to a first drive signal to be inputted.

The second system program storing unit 107 represents, for example, a secondary memory medium such as a hard disk. The second system program storing unit 107 stores a program used to generate a drive signal of the second system. In the present embodiment, the second system program storing unit 107 stores a program for controlling the NC, for example. Specifically, the second system program storing unit 107 stores a program for causing the shaft of the tool 21 of the industrial machine 20 to machine the workpiece W.

The second drive signal generation unit 108 is achieved as the CPU operates, for example. The second drive signal generation unit 108 generates a second drive signal which is a drive signal of the second system. In the present embodiment, the second drive signal generation unit 108 generates a drive signal for driving the shaft (the tool shaft S2) of the tool 21 of the industrial machine 20.

The second drive signal output unit 109 is achieved as the CPU operates, for example. The second drive signal output unit 109 outputs a second drive signal which is a drive signal of the second system. The second drive signal output unit 109 outputs a second drive signal at a drive frequency longer than a drive frequency at which the first drive signal output unit 103 outputs a signal, for example.

The selection acquisition unit 111 is achieved as the CPU operates, for example. The selection acquisition unit 111 acquires a selection of whether or not to generate a combined drive signal. The selection acquisition unit 111 acquires, when a first drive signal and a second drive signal are to be combined with each other, for example, a selection of whether combining is "necessary". On the other hand, the selection acquisition unit 111 acquires, when a first drive signal and a second drive signal are not to be combined with each other, a selection of whether combining is "unnecessary".

The combined timing acquisition unit 112 is achieved as the CPU operates, for example. The combined timing acquisition unit 112 externally acquires a timing of combining a first drive signal and a second drive signal with each other. The combined timing acquisition unit 112 acquires, when combining is "necessary" is selected, a timing of combining a first drive signal and a second drive signal with each other. The combined timing acquisition unit 112 acquires a program block or a conveyance position to be combined as a combined timing, for example. Specifically, the combined timing acquisition unit 112 acquires, as combined timings, in FIG. 2, a first drive signal by which a mounting table of the workpiece W is conveyed to the position P1 and a second drive signal by which the tool 21 is driven to machine the workpiece W. The combined timing acquisition unit 112 uses an input device (not shown) such as a keyboard to acquire combined timings.

The combined timing determination unit 113 is achieved as the CPU operates, for example. The combined timing determination unit 113 determines a combined timing of a first drive signal and a second drive signal with each other. The combined timing determination unit 113 determines a timing acquired by the combined timing acquisition unit 112 as a combined timing.

The combined drive signal generation unit 114 is achieved as the CPU operates, for example. The combined drive signal generation unit 114 generates a combined drive signal when a selection of generating a combined drive signal is acquired. Furthermore, the combined drive signal generation unit 114 combines a first drive signal and a second drive signal with each other to generate a combined drive signal based on the determined combined timing. The combined drive signal generation unit 114 generates a combined drive signal by combining a compensation drive signal and a second drive signal with each other. The combined drive signal generation unit 114 combines, for example, as illustrated in FIG. 5, a compensation drive signal which is an output of a compensated positional command of the first system and a second drive signal which is a positional command of the second system with each other.

The operation control unit 115 is achieved as the CPU operates, for example. The operation control unit 115 uses the first operating speed, the second operating speed, and the combined drive signal to control operation of the second system. Furthermore, the operation control unit 115 uses the first drive signal to control operation of the first system. The operation control unit 115 controls operation of the conveyor machine 10 based on a first drive signal, in FIG. 2, for example. That is, the operation control unit 115 controls conveyance of the workpiece W based on the first drive signal. The operation control unit 115 includes, as illustrated in FIGS. 5 and 6, the first operating speed calculation unit 106, a first compensator 151, the second operating speed calculation unit 110, and a second compensator 152.

The first operating speed calculation unit 106 calculates an operating speed of the first system from the compensation drive signal as a first operating speed. The first operating speed calculation unit 106 calculates, for example, a value of speed feed-forward from the compensation drive signal. The first operating speed calculation unit 106 calculates a value indicated by S·V1FF, as illustrated in FIG. 6, for example. The first operating speed calculation unit 106 outputs the calculated value as a first feed-forward signal.

Based on an operation characteristic of the conveyor machine 10, the first compensator 151 uses the transfer function G1($s$) to compensate an operational position of the conveyor machine with respect to the first drive signal. The first compensator 151 uses the compensated signal to control operation of the conveyor machine 10.

The second operating speed calculation unit 110 calculates an operating speed of the second system from the second drive signal as a second operating speed. The second operating speed calculation unit 110 calculates, for example, a second operating speed from the second drive signal as a value of speed feed-forward. The second operating speed calculation unit 110 calculates a value indicated by S·V2FF, as illustrated in FIG. 6, for example. The second operating speed calculation unit 110 outputs the calculated value as a second feed-forward signal.

Based on the operation characteristics of the conveyor machine 10 and the industrial machine 20, the second compensator 152 uses a transfer function G2($s$) to compensate an operational position of the industrial machine with respect to a sum of the first feed-forward signal, the second feed-forward signal, and the combined drive signal. The second compensator 152 uses the compensated signal to control operation of the industrial machine 20.

Furthermore, the operation control unit 115 uses the first operating speed, the second operating speed, and the combined drive signal to control machining operation of the tool 21. The operation control unit 115 uses, for example, a position indicated by the second drive signal and an operating speed acquired by summing the first operating speed and the second operating speed with each other to control operation of the second system. The operation control unit 115 combines, as illustrated in FIG. 6, for example, a combined drive signal, a speed characteristic V2($s$) of the second system, which is acquired by positional loop proportional gain, an operating speed calculated by the first operating speed calculation unit 106, and an operating speed calculated by the second operating speed calculation unit 110 with each other and uses the combined one as an actual command for the second system. Furthermore, the operation control unit 115 controls operation of the second system with respect to an actual positional command through a transfer function (W($s$)) of the second system by the transfer function (G2($s$)) of the compensator and a transfer function (P2($s$)) of the target to be controlled. Furthermore, the operation control unit 115 performs feedback control using the transfer function (W($s$)) and feedback control using an output value. Thereby, the operation control unit 115 controls operation of the production system 100 based on the first drive signal, the second drive signal, and the combined drive signal. Note herein that, when the selection acquisition unit 111 does not select combining of a first drive signal and a second drive signal with each other, the operation control unit 115 controls operation of the first system and the second system without combining the first drive signal and the second drive signal with each other.

Next, how operation of the computer numerical controller according to the present embodiment flows will now be described with reference to the flowchart illustrated in FIG. 7. The selection acquisition unit 111 first acquires a selection of whether or not combining of a first drive signal and a second drive signal with each other is necessary. The combined timing acquisition unit 112 determines whether or not combining is necessary (Step S1). When combining is to be executed (Step S1: YES), the combined timing acquisition unit 112 acquires a combined timing. Then, the processing proceeds to Step S2. On the other hand, when combining is not to be executed (Step S1: NO), the combined timing acquisition unit 112 causes the first drive signal generation unit 102 and the second drive signal generation unit 108 to respectively generate a first drive signal and a second drive signal. Then, the processing proceeds to Step S7.

At Step S2, the combined timing acquisition unit 112 acquires a timing of performing combining. The combined timing acquisition unit 112 sends the acquired timing of performing combining to the combined timing determination unit 113.

Next, the combined timing determination unit 113 determines a combined timing of combining a first drive signal and a second drive signal with each other based on the acquired timing of performing combining. The first drive signal output unit 103 and the second drive signal output unit 109 respectively generate a first drive signal and a second drive signal (Step S3), and send the generated first drive signal and the generated second drive signal to the combined drive signal generation unit 114. Furthermore, the first drive signal output unit 103 and the second drive signal output unit 109 respectively send the generated first drive signal and the generated second drive signal to the operation control unit 115.

Next, the transfer characteristic acquisition unit 104 acquires a transfer characteristic of the first system (Step S4). Next, the compensation unit 105 uses the acquired transfer characteristic to compensate the first drive signal to generate a compensation drive signal (Step S5).

Next, based on the combined timing that the combined timing determination unit 113 has determined, the combined drive signal generation unit 114 uses the compensation drive signal and the second drive signal to generate a combined drive signal (Step S6).

At Step S7, the operation control unit 115 causes the conveyor machine 10 and the industrial machine 20 to operate. Note herein that the first operating speed calculation unit 106 uses the generated compensation drive signal to calculate a first operating speed. Furthermore, the second operating speed calculation unit 110 uses the second drive signal to calculate a second operating speed. The operation control unit 115 uses the first operating speed, the second operating speed, and the second drive signal to control the conveyor machine 10 and the industrial machine 20. Note that, when no combined drive signal has been generated, the operation control unit 115 uses the first drive signal to control the conveyor machine 10. Furthermore, when no combined drive signal has been generated, the operation control unit 115 uses the second drive signal to control the industrial machine 20.

Next, the program according to the present disclosure will now be described herein. It is possible to achieve each of the components included in the operation control device 1 in the form of hardware or software or a combination of hardware and software. Note herein that achievement in the form of software means achievement when a computer reads and executes a program.

It is possible to use a non-transitory computer readable medium that varies in type to store the program, and to supply the program to a computer. Examples of the non-transitory computer readable medium include tangible storage media that vary in type. Examples of the non-transitory computer readable medium include magnetic recording media (for example, flexible disc, magnetic tape, and hard disk drive), magneto-optical recording media (for example, magneto-optical disc), compact disc-read only memories (CD-ROM), compact disc-recordable (CD-R), compact disc-rewritable (CD-R/W), and semiconductor memories (for example, mask ROM, programmable ROM (PROM), erasable PROM (EPROM), flash ROM, and random access memory (RAM)). Furthermore, the display program may be supplied to the computer via a transitory computer readable medium that varies in type. Examples of the transitory computer readable medium include electric signals, optical signals, and electromagnetic waves. A transitory computer readable medium is able to supply the program to the computer via wired communication channels such as electric wires and optical fibers or wireless communication channels.

Implementation Examples

Figure 8:
FIG. 8 is a graph illustrating a relation between a time and a position pertaining to a shaft of a programmable logic controller (PLC) according to an implementation example.
Figure 9:
FIG. 9 is a graph illustrating a relation between a time and a position pertaining to a shaft of a numerical controller (NC) according to an implementation example.
Figure 10:
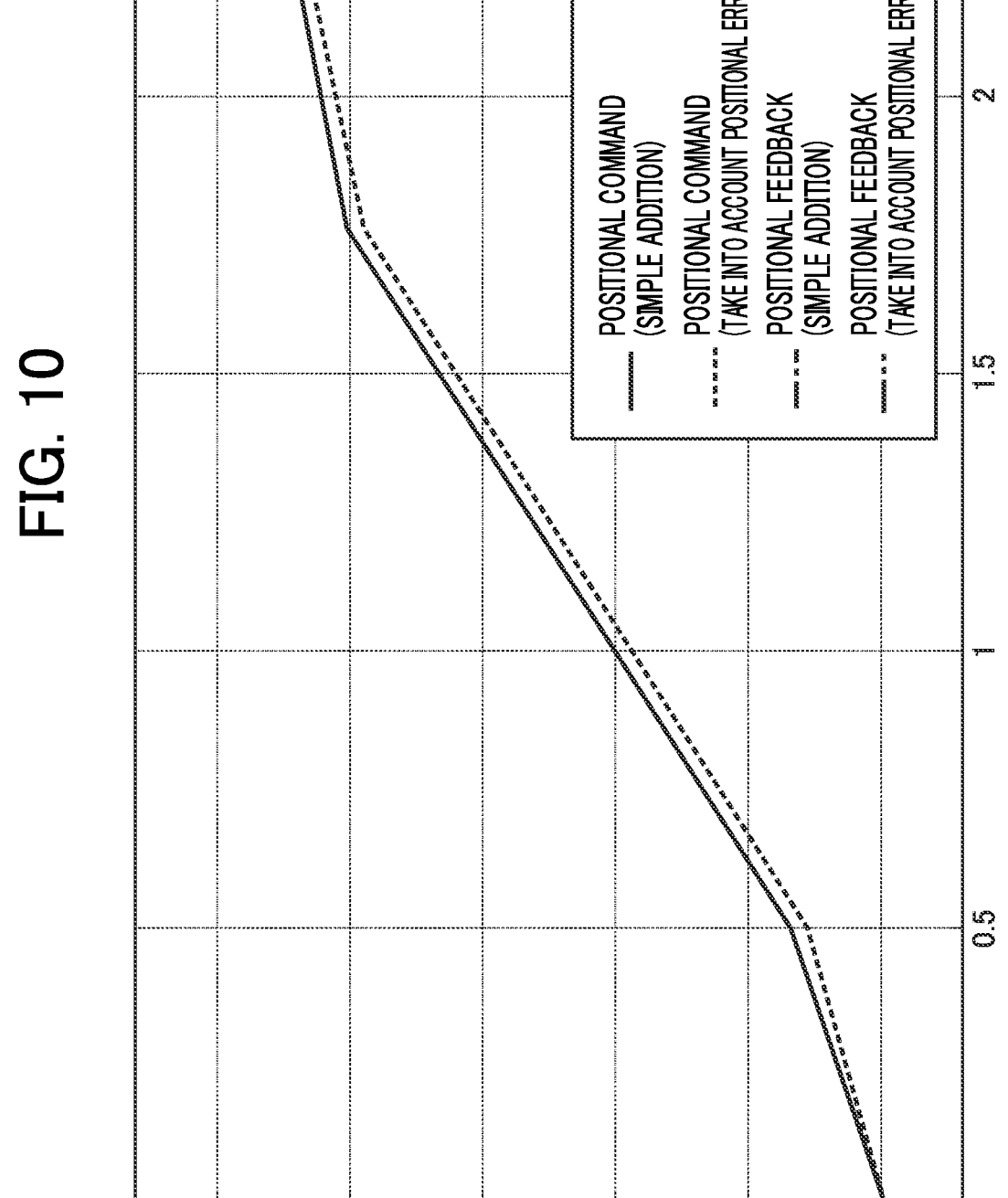
FIG. 10 is a graph illustrating a relation between a time and a position pertaining to a common shaft according to an implementation example.

Next, implementation examples of the present embodiment will now be described herein. As illustrated in FIGS. 8 to 10, the operation control device 1 has caused the shaft of the PLC (the first system) to move at a constant speed with respect to a change in time. From a time of 0.5 seconds to a time of approximately 1.75 seconds after started, the operation control device 1 has caused the shaft of the NC (the second system) to move at a constant speed, but faster than the first system, in a direction identical to an operation direction of the first system. Then, the operation control device 1 has caused the common shaft (the second system operated using a combined drive signal) to be operated in both a case where a drive signal of the shaft of the PLC and a drive signal of the shaft of the NC are simply added with each other and a case where a positional error of the shaft of the PLC is taken into account. Note that, although a difference between a positional command and positional feedback (FB) occurs around a speed change point, in FIGS. 8 and 9, operation continues without allowing the difference to increase when the operation is stable. Although four graphs are seen as if they are overlapping with each other in FIG. 10, the four graphs respectively indicate different values in FIG. 11 where a part of a stability time (for example, between approximately 1 second to approximately 1.5 seconds) is extracted.

Figure 11:
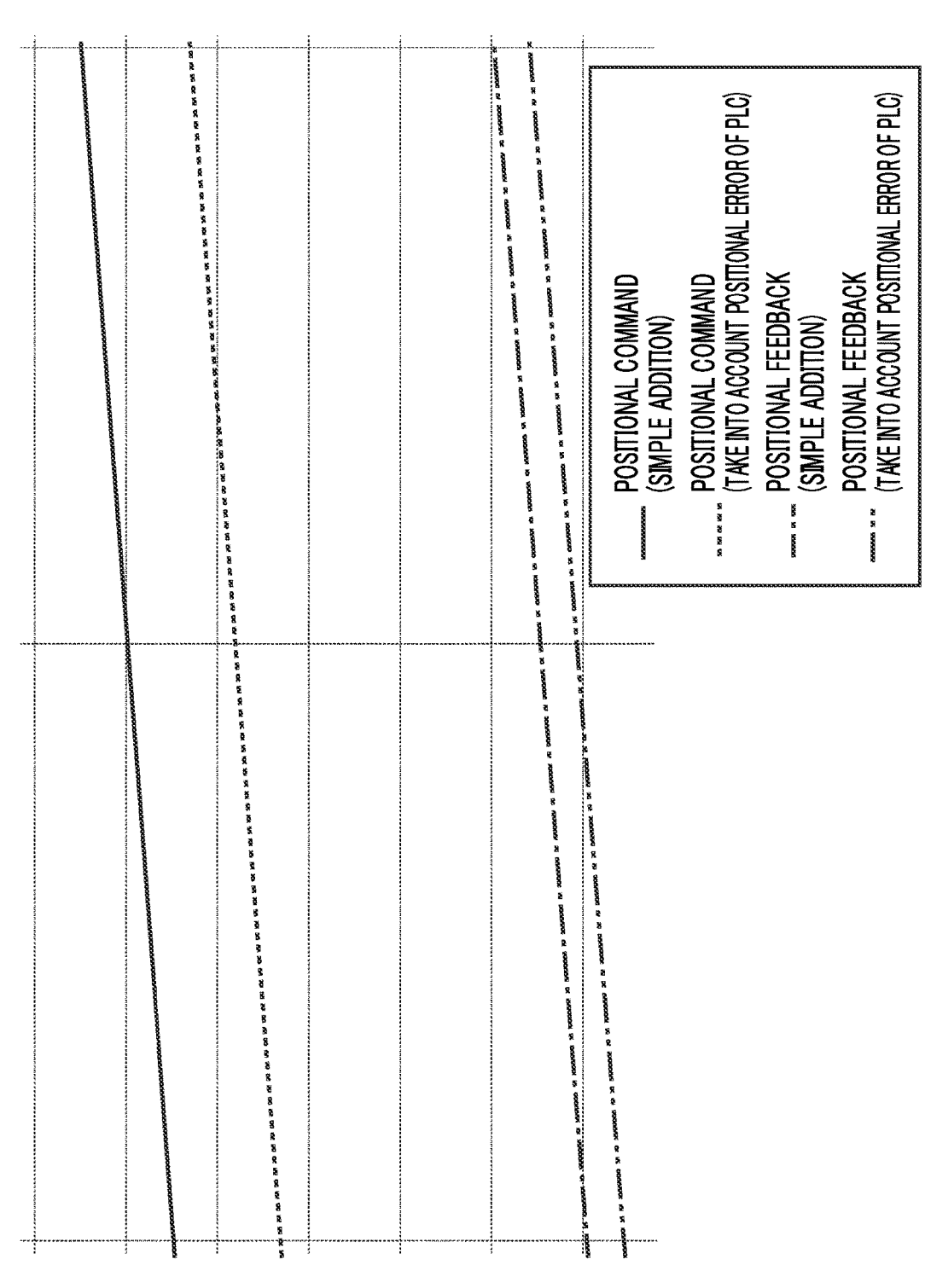
FIG. 11 is a partial enlarged view of FIG. 10.

Based on a positional command when a first drive signal and a second drive signal were simply added with each other, regarding operation of the common shaft, as illustrated in FIG. 11, it was able to acquire positional feedback (FB) when the first drive signal and the second drive signal were simply added with each other. Furthermore, based on a positional command when a positional error of the shaft of the PLC was taken into account, regarding operation of the common shaft, it was able to acquire positional feedback when the positional error was taken into account.

Figure 12:
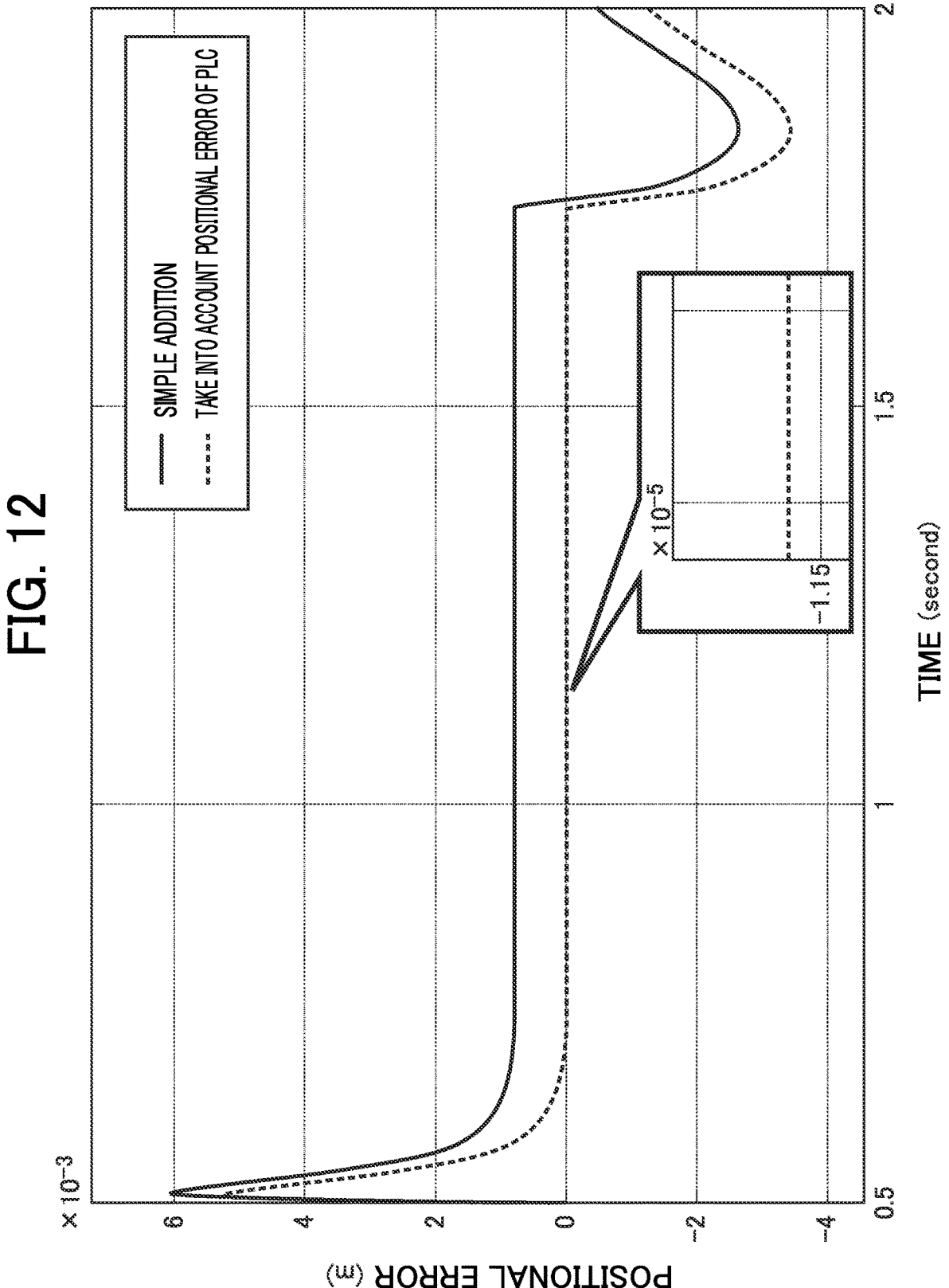
FIG. 12 is a graph illustrating a comparison between a position of the common shaft, to which a positional error has been taken into account, and a position of the common shaft, to which simple addition takes place, according to an implementation example.

Then, a difference in positional feedback between the shaft of the PLC and the shaft of the NC was calculated from the positional feedback of the common shaft when simple addition was performed, as illustrated in FIG. 12. Furthermore, a difference in positional feedback between the shaft of the PLC and the shaft of the NC was calculated from the positional feedback of the common shaft when the positional error was taken into account. Then, both the differences were compared with each other. As a result, a difference when simple addition was performed (during a period between approximately 1 second to approximately 1.5 seconds) was +773 μm. On the other hand, a difference when the positional error was taken into account (during a period between approximately 1 second to approximately 1.5 seconds) was −11.2 μm. Therefore, compared with the case when simple addition was performed, it was found that the positional error of the common shaft was improved in the case where the positional error was taken into account and combining was performed.

With the operation control device 1 and the program according to the embodiment, it is possible to achieve effects described below.

(1) The operation control device 1 that uses at least drive signals of two systems to control operation of the production system 100 including the industrial machine 20. The operation control device 1 includes: the first drive signal output unit 103 that outputs a first drive signal which is a drive signal of a first system; the second drive signal output unit 109 that outputs a second drive signal which is a drive signal of a second system; the transfer characteristic acquisition unit 104 that acquires a transfer characteristic of positional control of the first system; the compensation unit 105 that uses the acquired transfer characteristic to compensate the outputted first drive signal into a compensation drive signal; the first operating speed calculation unit 106 that calculates an operating speed of the first system from the compensation drive signal as a first operating speed; the second operating speed calculation unit 110 that calculates an operating speed of the second system from the second drive signal as a second operating speed; the combined drive signal generation unit 114 that generates a combined drive signal by combining the compensation drive signal and the second drive signal with each other; and the operation control unit 115 that uses the first operating speed, the second operating speed, and the combined drive signal to control operation of the second system. Since a drive signal (a positional command) that is compensated by taking into account a transfer characteristic of the first system is to be combined with a second drive signal, it is possible to suppress occurrence of a synchronization error regardless of respective gains of the two systems. Furthermore, since gains of the two systems do not leave impacts, it is possible to improve the processing speed and the machining accuracy.

(2) The operation control device 1 further includes the selection acquisition unit 111 that acquires a selection of whether or not to generate a combined drive signal, in which the combined drive signal generation unit 114 generates a combined drive signal when the selection acquisition unit 111 has acquired a selection of generating a combined drive signal. Thereby, since it is possible to increase selections for control in number, it is possible to improve its versatility.

(3) The operation control unit 115 uses a position indicated by the second drive signal and an operating speed acquired by summing the first operating speed and the second operating speed with each other to control operation of the second system. Thereby, since it is possible to perform control in accordance with response characteristics of the first system and the second system, it is possible to advantageously perform control in which positional transfer characteristics of the industrial machine 20 and the conveyor machine 10 are taken into account.

The operation control device 1 and the program according to the embodiment of the present disclosure have been described. However, the present disclosure is not limited to the embodiment described above. It is possible to appropriately change the embodiment.

For example, in the embodiment described above, operation of the combined timing acquisition unit 112 is not limited to acquisition of a combined timing inputted into an input device (not shown) such as a keyboard. The combined timing acquisition unit 112 may acquire a combined timing that is set from another program, for example.

Furthermore, in the embodiment described above, it has been described that a first drive signal and a second drive signal are those for the PLC that conveys the workpiece W and the NC that drives the tool 21. However, the present disclosure is not limited to this case. A first drive signal may be one for an NC that conveys the workpiece W and a PLC that performs simple machining on the workpiece W, for example.

Furthermore, in the embodiment described above, it has been described the operation control device 1 that controls operation using drive signals of the two systems. However, the present disclosure is not limited to this case. The operation control device 1 may control operation using drive signals of three or more systems. For example, when operation of the tool 21 of each of a plurality of the industrial machines 20 is regarded as one system, the operation control device 1 may control operation using drive signals of three or more systems. Furthermore, in the embodiment described above, it has been described that a first system represents a PLC and a second system represents an NC. However, the present disclosure is not limited to this case. A first system may be an NC and a second system may be a PLC. Other drive signals may be used.

Furthermore, when a first drive signal and a second drive signal are not to be combined with each other in the embodiment described above, the combined drive signal generation unit 114 may not generate a combined drive signal, but may output only the first drive signal and the second drive signal to the operation control unit 115.

Figure 13:
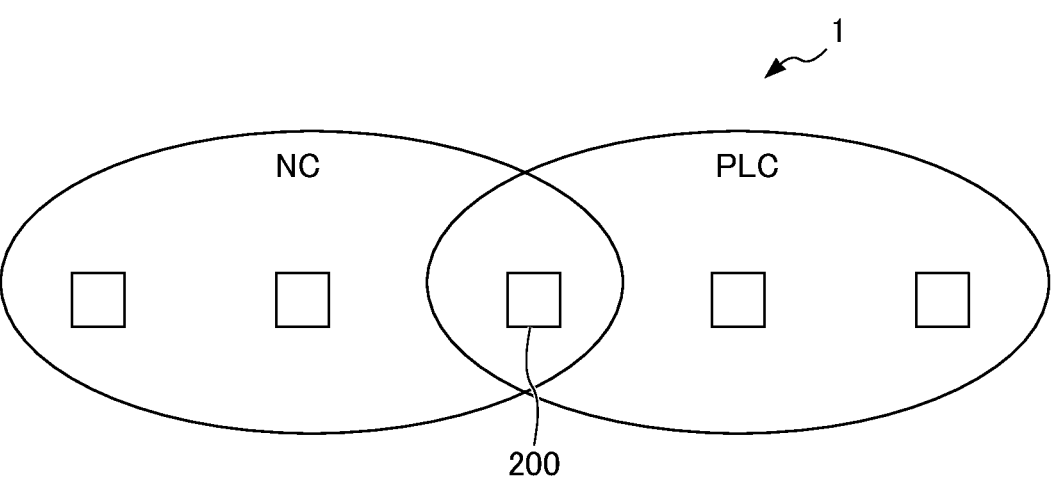
FIG. 13 is a schematic diagram illustrating a common shaft controlled by a control device according to a modification example.

Furthermore, in the embodiment described above, it has been described that a first system represents a PLC and a second system represents an NC. However, the present disclosure is not limited to this case. The production system 100 may include a configuration common to a first system and a second system (a common shaft 200), as illustrated in FIG. 13. That is, the production system 100 may include the common shaft 200 that is operable based on any signal such as a first drive signal, a second drive signal, or a combined drive signal. When no combined drive signal is to be generated (when a selection of whether combining is "unnecessary" is acquired), the selection acquisition unit 111 may acquire a selection of either a first drive signal or a second drive signal as a signal causing the common shaft 200 to operate. The selection acquisition unit 111 may determine a selection of causing the common shaft 200 to operate in accordance with either a first drive signal or a second drive signal based on an externally provided input, a command value included in the first drive signal, or a command value included in the second drive signal. Then, the first drive signal output unit 103 and the second drive signal output unit 109 may respectively individually output the first drive signal or the second drive signal to the common shaft 200.

Furthermore, in the embodiment described above, the combined timing determination unit 113 combines a first drive signal and a second drive signal with each other based on an acquired combined timing. However, the present disclosure is not limited to this case. The operation control device 1 may not include the combined timing acquisition unit 112 and the combined timing determination unit 113. In this case, the first drive signal output unit 103 and the second drive signal output unit 109 may respectively output a first drive signal and a second drive signal each for which a combined timing has been taken into account beforehand. The combined drive signal generation unit 114 may superimpose as is an outputted first drive signal and an outputted second drive signal with each other to generate a combined signal.

EXPLANATION OF REFERENCE NUMERALS

1 Operation control device
20 Industrial machine
21 Tool
100 Production system
103 First drive signal output unit
104 Transfer characteristic acquisition unit
105 Compensation unit
106 First operating speed calculation unit
109 Second drive signal output unit
110 Second operating speed calculation unit
111 Selection acquisition unit
113 Combined timing determination unit
114 Combined drive signal generation unit
115 Operation control unit
W Workpiece

The invention claimed is:

1. An operation control device that uses at least drive signals of two systems to control operation of a production system including an industrial machine, the operation control device comprising:

a first drive signal output unit that outputs a first drive signal which is a drive signal of a first system;

a second drive signal output unit that outputs a second drive signal which is a drive signal of a second system;

a transfer characteristic acquisition unit that acquires a transfer characteristic of positional control of the first system;

a compensation unit that uses the acquired transfer characteristic to compensate the outputted first drive signal into a compensation drive signal;

a first operating speed calculation unit that calculates an operating speed of the first system from the compensation drive signal as a first operating speed;

a second operating speed calculation unit that calculates an operating speed of the second system from the second drive signal as a second operating speed;

a combined drive signal generation unit that generates a combined drive signal by combining the compensation drive signal and the second drive signal with each other; and an operation control unit that uses the first operating speed, the second operating speed, and the combined drive signal to control operation of the second system.

2. The operation control device according to claim 1, further comprising a selection acquisition unit that acquires a selection of whether or not to generate the combined drive signal, wherein the combined drive signal generation unit generates the combined drive signal when the selection acquisition unit has acquired a selection of generating the combined drive signal.

3. The operation control device according to claim 1, wherein the operation control unit uses a position indicated by the second drive signal and a summed operating speed acquired by summing the first operating speed and the second operating speed with each other to control operation of the second system.

4. A non-transitory computer readable medium which non-transitorily stores a program that causes a computer to function as an operation control device that uses at least drive signals of two systems to control operation of a production system including an industrial machine, the program causing the computer to function as:

a first drive signal output unit that outputs a first drive signal which is a drive signal of a first system;

a second drive signal output unit that outputs a second drive signal which is a drive signal of a second system;

a transfer characteristic acquisition unit that acquires a transfer characteristic of positional control of the first system;

a compensation unit that uses the acquired transfer characteristic to compensate the outputted first drive signal into a compensation drive signal;

a first operating speed calculation unit that calculates an operating speed of the first system from the compensation drive signal as a first operating speed;

a second operating speed calculation unit that calculates an operating speed of the second system from the second drive signal as a second operating speed;

a combined drive signal generation unit that generates a combined drive signal by combining the compensation drive signal and the second drive signal with each other; and an operation control unit that uses the first operating speed, the second operating speed, and the combined drive signal to control operation of the second system.

\* \* \* \* \*